United States Patent
Choi et al.

(10) Patent No.: US 8,463,134 B2
(45) Date of Patent: Jun. 11, 2013

(54) APPARATUS AND METHOD FOR TRANSMITTING AND RECEIVING DATA USING VISIBLE LIGHT COMMUNICATION

(75) Inventors: Jeong-Seok Choi, Yongin-si (KR);
Yun-Je Oh, Yongin-si (KR);
Dae-Kwang Jung, Suwon-si (KR);
Hong-Seok Shin, Suwon-si (KR);
Kyung-Woo Lee, Yongin-si (KR);
Dong-Jae Shin, Seoul (KR); Sung-Bum Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 343 days.

(21) Appl. No.: 12/918,950

(22) PCT Filed: Feb. 20, 2009

(86) PCT No.: PCT/KR2009/000815
§ 371 (c)(1),
(2), (4) Date: Aug. 23, 2010

(87) PCT Pub. No.: WO2009/104921
PCT Pub. Date: Aug. 27, 2009

(65) Prior Publication Data
US 2011/0002695 A1     Jan. 6, 2011

(30) Foreign Application Priority Data
Feb. 21, 2008    (KR) ........................ 10-2008-0015789

(51) Int. Cl.
*H04B 10/00*     (2006.01)
(52) U.S. Cl.
USPC ........... 398/172; 398/128; 398/130; 398/135; 398/158; 398/159; 398/119; 398/136; 398/118

(58) Field of Classification Search
USPC ................. 398/172, 135, 128, 130, 127, 118, 398/136, 41, 155, 158, 159, 140, 164, 33, 398/182, 183, 186, 189, 192, 202, 208, 119, 398/193, 194
See application file for complete search history.

(56) References Cited

U.S. PATENT DOCUMENTS 7,949,259 B2 *   5/2011   Suzuki ........................ 398/172
8,019,229 B2     9/2011   Fujiwara
(Continued)

FOREIGN PATENT DOCUMENTS
JP   2007-180826    7/2007
JP   2009-010487    1/2009
(Continued)

OTHER PUBLICATIONS

PCT/ISA/237 Written Opinion issued in PCT/KR2009/000815 (7pp), 2009.
(Continued)

*Primary Examiner* — Hanh Phan
(74) *Attorney, Agent, or Firm* — The Farrell Law Firm, P.C.

(57) ABSTRACT

Provided is an apparatus and method for transmitting and receiving data in a visible light communication system, the apparatus including a visible light communication (VLC) transceiver for converting a visible light signal received from a counterpart into an electrical signal and outputting the electrical signal, by using a light receiving device during a reception operation, and converting an electrical signal containing information into a visible light signal and transmitting the visible light signal to the counterpart, by using a light emitting device during a transmission operation, a VLC controller comprising a visible frame engine (VFE) for generating a visible frame and outputting the visible frame to the VLC transceiver, in which the VFE generates the visible frame for transmission to a counterpart during non-transmission of respective frames for communication at a sender and a receiver in order to provide visibility to a communication link, and a host controller for controlling the VLC controller and transmitting and receiving data to and from the VLC controller.

13 Claims, 6 Drawing Sheets

U.S. PATENT DOCUMENTS

| | | |
|---|---|---|
| 8,019,230 B2 * | 9/2011 | Choi et al. ............ 398/172 |
| 2007/0058987 A1 | 3/2007 | Suzuki |
| 2007/0147843 A1 | 6/2007 | Fujiwara |
| 2009/0028558 A1 | 1/2009 | Choi |
| 2009/0185802 A1 | 7/2009 | Choi |

FOREIGN PATENT DOCUMENTS

| | | |
|---|---|---|
| KR | 1020080108732 | 12/2008 |
| WO | WO 2008/010274 | 1/2008 |

OTHER PUBLICATIONS

Hidemitsu Sugiyama et al., "Brightness Control Methods for Illumination and Visible-Light Communication Systems", Proceedings of the Third International Conference on Wireless and Mobile Communications (ICWMC'07), Mar. 1, 2007.

\* cited by examiner

ABSTRACT: Lost

APPARATUS AND METHOD FOR TRANSMITTING AND RECEIVING DATA USING VISIBLE LIGHT COMMUNICATION

TECHNICAL FIELD

The present invention relates to visible light communication, and more particularly, to an apparatus and method for transmitting and receiving data using visible light communication.

BACKGROUND ART

In an Open Systems Interconnection (OSI) model, a data link layer manages a communication link and executes a function related thereto. Thus, the data link layer constructs a frame used in communication and defines various details for efficient transmission of the frame. Representative examples of the function performed by the data link layer are controlling an address structure and a basic flow of a frame, controlling an error, and controlling an access to a communication medium.

Figure 1:
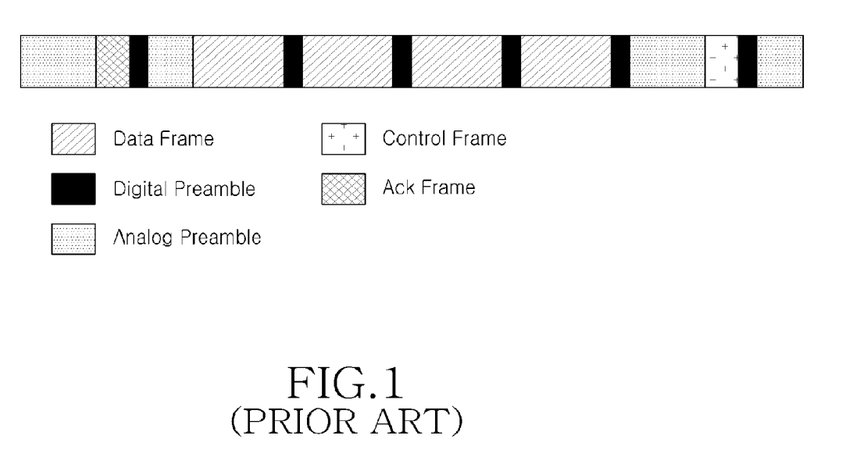
FIG. 1 illustrates an exemplary frame structure for data transmission in a general Ethernet system.

FIG. 1 illustrates an exemplary frame structure for data transmission in a general Ethernet system. Referring to FIG. 1, a frame for data transmission in a general Ethernet system consists of an analog preamble carrying synchronization information between a transmitter and a receiver, a data frame which is a payload of data containing information to be actually transmitted, a digital preamble indicating the start of the data frame, a control frame for communication link control, and an acknowledge (ACK) frame indicating a response to data transmission of a counterpart. With reference to the foregoing description associated with FIG. 1, a description will now be made regarding operations of transmitting and receiving each of the frames during data transmission and reception in a general Ethernet system.

Figure 2A:
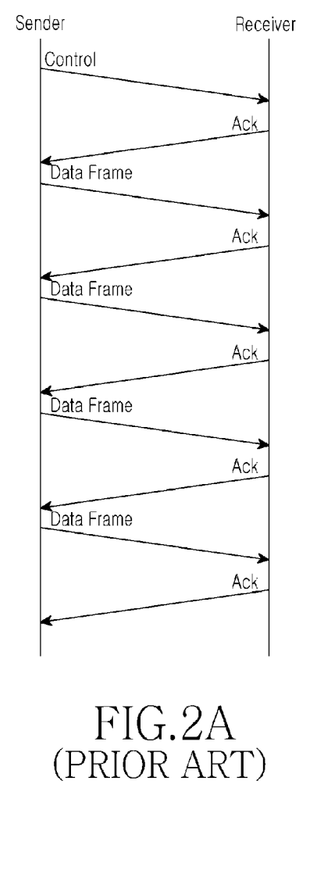
FIGS. 2A through 2C are flow diagrams illustrating exemplary data transmission and reception processes in a general Ethernet system.
Figure 2B:
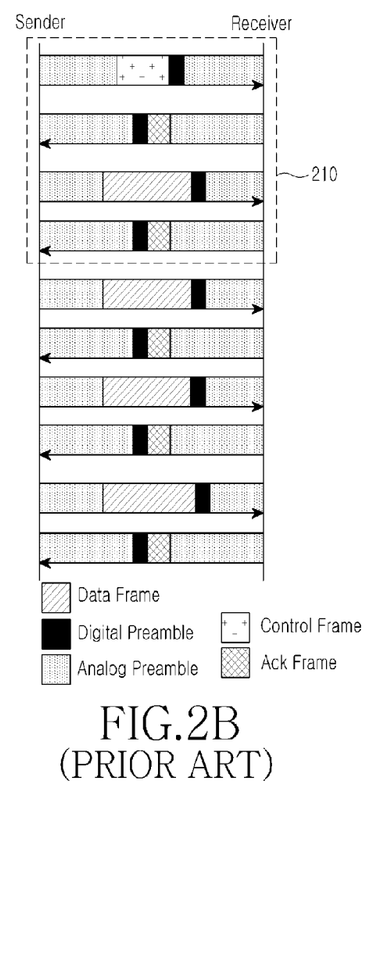
Figure 2C:
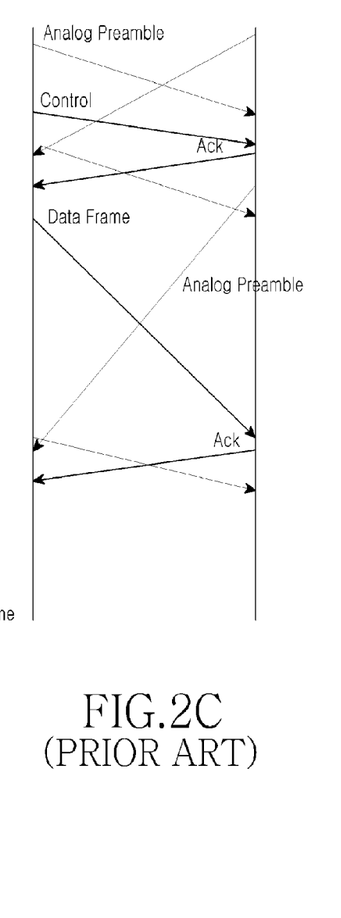

FIGS. 2A through 2C are flow diagrams illustrating exemplary data transmission and reception processes in a general Ethernet system.

FIG. 2A illustrates a data flow between a sender and a receiver in data transmission and reception processes in a general Ethernet system. As illustrated in FIG. 2A, the sender transmits a control frame to the receiver. After receiving the control frame, the receiver transmits an ACK frame to the sender in order to respond to the received control frame, thereby establishing a link between the sender and the receiver. The sender transmits a data frame to the receiver to initiate actual data communication by using the established link, and the receiver transmits an ACK frame to respond to the received data frame, thereby performing data communication. Each of the transmitted control frame and ACK frame, and the data frame transmitted after establishment of the link and a response frame thereto, i.e., the ACK frame, is transmitted together with a digital preamble behind the digital preamble.

FIG. 2B illustrates a flow of frames transmitted and received in a data transmission process in a general Ethernet system. For communication between a sender and a receiver, a data link is constructed as will be described hereinafter. As described with reference to FIG. 2A, once the sender transmits a digital preamble and a control frame to the receiver for link establishment, the receiver, after receiving the control frame, transmits the digital preamble and an ACK frame to the sender to inform the sender that the link has been established. The sender transmits the digital preamble and a data frame through the established link, and the receiver transmits the digital preamble and an ACK frame to the sender to respond to the received data. In this way, link establishment and data transmission are performed.

FIG. 2C illustrates a data flow of a part 210 indicated by a dotted line in the data transmission process illustrated in FIG. 2B. As illustrated in FIG. 2C, in the data transmission process of a general Ethernet system, in order to maintain synchronization between the sender and the receiver, the sender and the receiver transmit analog preambles to their counterparts during non-transmission of data as well as during transmission of data from the sender to the receiver or from the receiver to the sender.

When a communication protocol type as described above is applied to a visible light communication system, a visible light transmitter and a visible light receiver have to continuously maintain outputs of visible light signals in an 'ON' state due to the analog preambles. Since the output signals of the transmitter and the receiver are in the 'ON' state at all times, any change cannot be made to the visibility of communication and information differences cannot be checked visibly. Moreover, since this type of protocol is suitable on a cable without taking account of power, outputs of the transmitter and the receiver are maintained in the 'ON' state at all times, resulting in unnecessary power consumption.

Accordingly, there is a need for a visible light communication system capable of executing a function provided in a conventional data link layer, providing visibility to a communication channel, securing visibility, and adjusting the visibility in a communication link, and a communication protocol for the visible light communication system.

DISCLOSURE OF INVENTION

Technical Problem

The present invention provides a visible light communication system and a method for transmitting and receiving data in which a function provided in a conventional data link layer is executed for visible light communication, visibility is provided to a communication channel, and the visibility is adjustable when necessary.

Technical Solution

To achieve the foregoing object, according to an aspect of the present invention, there is provided an apparatus for transmitting and receiving data in a visible light communication system. The apparatus includes a visible light communication (VLC) transceiver for converting a visible light signal received from a counterpart into an electrical signal and outputting the electrical signal, by using a light receiving device during a reception operation, and converting an electrical signal containing information into a visible light signal and transmitting the visible light signal to the counterpart, by using a light emitting device during a transmission operation, a VLC controller comprising a visible frame engine (VFE) for generating a visible frame and outputting the visible frame to the VLC transceiver, in which the VFE generates the visible frame for transmission to a counterpart during non-transmission of respective frames for communication at a sender and a receiver in order to provide visibility to a communication link, and a host controller for controlling the VLC controller and transmitting and receiving data to and from the VLC controller.

According to another aspect of the present invention, there is provided a method for transmitting and receiving data in a visible light communication system. The method includes transmitting, by a sender, a control frame for link control, to a receiver, receiving, by the receiver, the control frame and transmitting an ACK frame to the sender to respond to the received control frame, transmitting, by the sender, a data frame containing information to the receiver, and receiving, by the receiver, the data frame and transmitting an ACK frame to the sender to respond to the received data frame, in which a visible frame is transmitted to a counterpart during non-transmission of respective frames for communication at the sender and the receiver in order to provide visibility to a communication link.

The visible frame includes a preamble which is a signal having '1' and '0' repeated in a predetermined number of bits, a start (STA) including a particular bit sequence to indicate a start of a frame, an information (Info) block indicating information on a visible pattern block, the visible pattern block defined as a code that is not used in an 8B/10B encoding scheme, and a stop (STO) including a particular bit sequence to indicate an end of the frame.

Advantageous Effects

According to the present invention, through an operating procedure of a method for transmitting and receiving data in a visible light communication system, it is possible to not only execute a unique function of communication in a communication channel using a visible light but also secure and adjust visibility in the communication channel using a visible light. Moreover, visibility is provided to a communication link and a transceiver operates only when communication is required, thereby implementing a visible light communication channel having low power consumption.

BEST MODE FOR CARRYING OUT THE INVENTION

Hereinafter, with reference to the annexed drawings, an apparatus and operation method constituting the present invention will be described in detail by referring to an embodiment of the present invention. In the following description, the matters defined in the description such as a detailed construction and elements are provided to assist a comprehensive understanding of the present invention, and those of ordinary skill in the art will recognize that various changes and modifications of the matters described herein can be made without departing from the scope and spirit of the invention. The detailed descriptions of functions and configurations incorporated herein that are well known to those skilled in the art will be omitted in order not to unnecessarily obscure the present invention.

A communication link of a visible light communication system uses a device having visibility such as a light emitting diode (LED), thus allowing a user to do a check with the eyes. The present invention provides a visible communication system and a method for transmitting and receiving data, in which the visibility of a link can be expressed using a visible frame engine (VFE) in such a visible communication system.

Figure 3:
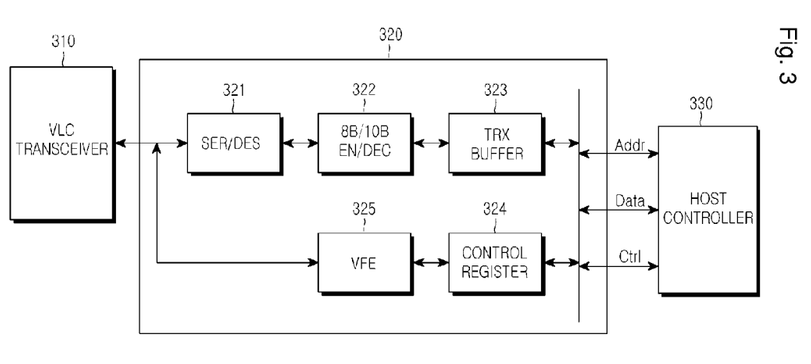
FIG. 3 is a block diagram of an apparatus for transmitting and receiving data in a visible light communication system according to an embodiment of the present invention.

FIG. 3 is a block diagram of an apparatus for transmitting and receiving data in a visible communication system according to an embodiment of the present invention. Referring to FIG. 3, the apparatus according to an embodiment of the present invention includes a visible light communication (VLC) transceiver 310, a VLC controller 320, and a host controller 330.

The VLC transceiver 310 uses a light emitting device such as a light emitting diode (LED), laser diode (LD), etc. or a light receiving device such as a photodiode, etc., such that it converts a received visible light into an electrical signal and then outputs the electrical signal to the VLC controller 320 by using the light receiving device during a reception operation, or it converts an electrical signal containing information into a visible light signal for transmission of the visible light signal by using the light emitting device during a transmission operation.

The host controller 330 is connected with the VLC controller 320 by using a central processing unit (CPU) interface. An operating system such as Windows or Linux is generally installed in the host controller 330 to control the system, and the host controller 330 performs communication through a device driver for the VLC controller 320, a protocol for visible light communication, and a visible light application.

The VLC controller 320 includes a transmission/reception (TRx) buffer 323, an 8B/10B encoder/decoder (En/Dec) 322, a serializer/deserializer (Ser/Des) 321, a control register 324, and a visible frame engine (VFE) 325 to perform a control operation such that a visible frame to be described below is output with a predetermined gap(or interval) during visible light communication.

The TRx buffer 323 is a memory space in which transmission data or received data is stored for communication.

The 8B/10B encoder/decoder 322 converts the format of transmission data into a format suitable for 8B/10B.

The serializer/deserializer 321 converts serial signals and parallel signals.

The control register 324 receives information required for controlling the VLC controller 320 from the host controller 330 and processes the information, or provides information required for controlling the VLC controller 320.

The VFE 325 generates a visible frame and transmits the visible frame on a communication link to secure the visibility of the link.

In a visible light link, the visible frame is managed as will be described below.

The visible frame can be bidirectionally transmitted on a communication link, and thus can be transmitted irrespective of transmission of a data frame. That is, a sender transmits the visible frame even when a receiver is receiving data, thereby securing visibility.

The visible frame has lower priority than the data frame, such that the VLC controller 320, although being transmitting the visible frame, immediately stops the transmission of the visible frame at the request for data transmission from the host controller 330, and then transmits the data frame requested by the host controller 330. A transmission and reception scheme of the visible frame will now be described in more detail with reference to the drawings.

Figure 4:
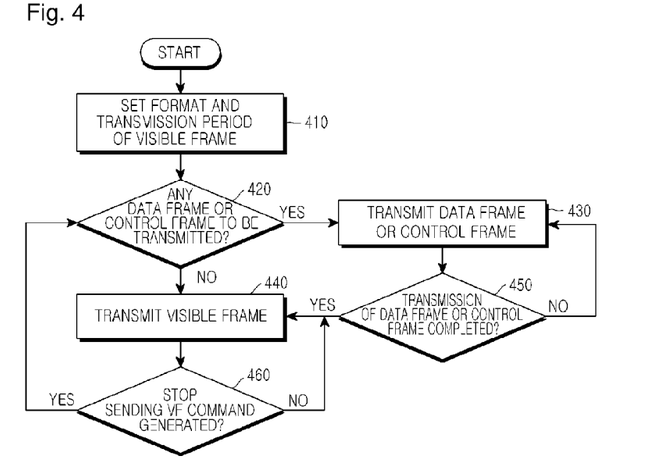
FIG. 4 is a flowchart illustrating a data transmission operation in a visible light communication system according to an embodiment of the present invention.

FIG. 4 is a flowchart illustrating an operation of transmitting a visible frame in a visible light communication system according to an embodiment of the present invention. Referring to FIG. 4, communication is initiated in step 410 in which the format and transmission period of the visible frame are set. In step 420, it is determined whether there is a data frame or control frame to be transmitted. If it is determined in step 420 that there is a data frame or control frame to be transmitted, the process goes to step 430 to transmit the data frame or control frame and then goes to step 450. In step 450, it is determined whether transmission of the data frame or control frame transmitted in step 430 has been completed. If it is determined in step 450 that the transmission of the data frame or control frame has been completed, the process goes to step 440 to transmit the visible frame according to the format and transmission period of the visible frame being set in step 410, and then goes to step 460. If it is determined in step 450 that the transmission of the data frame or control frame has not been completed, the process goes to step 430 to continue transmitting the data frame or control frame.

If it is determined in step 420 that there is no data frame or control frame to be transmitted, the process goes to step 440 to transmit the visible frame to a counterpart according to the format and transmission period of the visible frame being set in step 410, and then goes to step 460. In step 460, it is determined whether a transmission stop command for the visible frame (Stop Sending VF) is generated from the host controller. If it is determined in step 460 that the Stop Sending VF command is generated, the process goes to step 420. If it is determined in step 460 that the Stop Sending VF command is not generated, the process goes to step 440. Thereafter, if the entire communication has been completed, the VFE is terminated.

Figure 5:
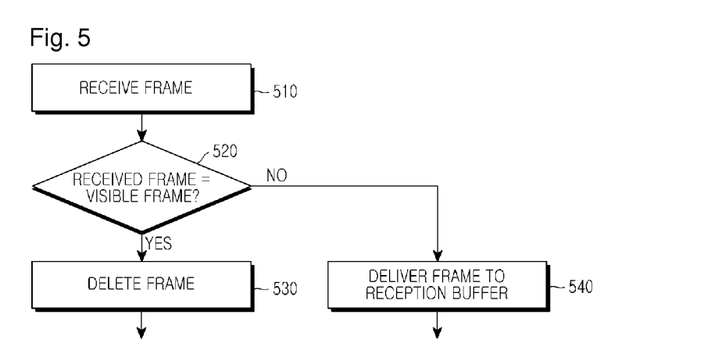
FIG. 5 is a flowchart illustrating a data reception operation in a visible light communication system according to an embodiment of the present invention.

FIG. 5 is a flowchart illustrating a data reception operation in a visible light communication system according to an embodiment of the present invention. Referring to FIG. 5, upon receipt of a frame in step 510, the process goes to step 520 to determine whether the received frame is a visible frame. Herein, the type of the frame can be determined from header information of the frame. If the frame received in step 520 is a visible frame, the process goes to step 530. Since the received visible frame is not actually required for communication, it is deleted in step 530 without being delivered to a reception buffer. If the frame received in step 520 is not the visible frame, the process goes to step 540. Since the received frame is an element required for communication, it is transmitted to the reception buffer in step 540 in order to be processed and then delivered to the protocol.

With reference to the drawings, a description will now be made regarding a method for constructing a visible frame and a method for transmitting a visible frame in a visible light communication system according to an embodiment of the present invention.

Figure 6:
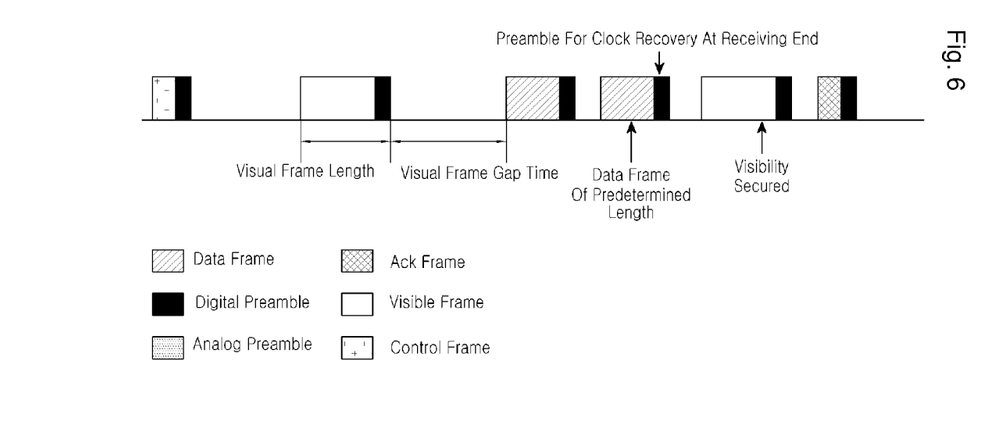
FIG. 6 illustrates an exemplary frame structure for data transmission in a visible light communication system according to an embodiment of the present invention.

FIG. 6 illustrates an exemplary frame structure for data transmission in a visible light communication system according to an embodiment of the present invention. As illustrated in FIG. 6, a frame in a visible light communication system according to an embodiment of the present invention includes a data frame which is a payload of data containing information to be actually transmitted, a digital preamble having functions of providing a signal for a clock-data recovery (CDR) of a receiving end and indicating the start of a data frame, an acknowledge (ACK) frame indicating a response to data transmission of a counterpart, a control frame for communication link control, and a visible frame for providing the visibility of a communication link during visible light communication.

With a method for transmitting and receiving data in a visible light communication system according to an embodiment of the present invention, it is possible to implement a datalink having visibility by using the above-described visible frame without a need to continuously transmit signals during transmission and reception.

FIGS. 7A through 7D are flow diagrams illustrating a data transmission process in a visible light communication system according to an embodiment of the present invention.

Figure 7:
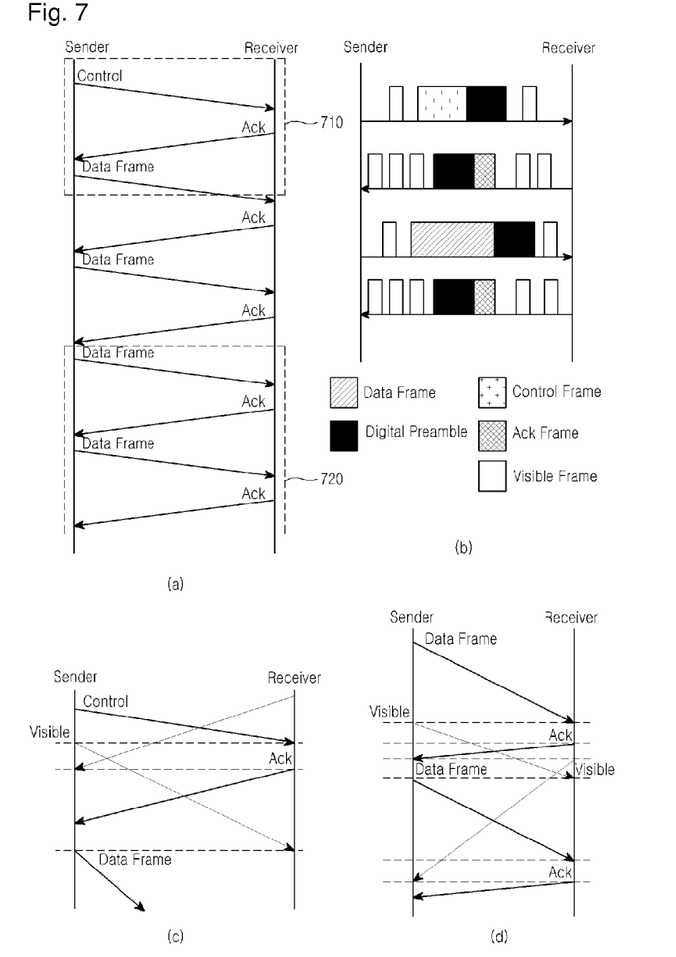
FIGS. 7A through 7D are flow diagrams illustrating a data transmission process in a visible light communication system according to an embodiment of the present invention.

FIG. 7A illustrates a flow of data between a sender and a receiver during data transmission and reception of a visible light communication system according to an embodiment of the present invention. As illustrated in FIG. 7A, the sender transmits a control frame to the receiver for communication link control. The receiver, upon receiving the control frame, transmits an ACK frame to the sender to respond to the received control frame, thereby establishing a link between the sender and the receiver. The sender transmits a data frame containing information to the receiver to initiate actual data communication by using the established link, and the receiver transmits an ACK frame to the sender to respond to the received data frame, thereby performing data communication. Each of the transmitted control frame and ACK frame, and the data frame transmitted after establishment of the link and a response frame thereto, i.e., the ACK frame, is transmitted together with a digital preamble behind the digital preamble.

FIG. 7B illustrates frames transmitted and received during data transmission of a visible light communication system according to an embodiment of the present invention. Transmission and reception operations of a visible light communication system according to an embodiment of the present invention use a visible frame to provide visibility to a communication link according to features of the present invention. To be more specific, the sender and the receiver continuously transmit the visible frame with a predetermined gap to provide visibility.

Referring to FIG. 7B, the sender stops transmission of the visible frame for link establishment, and transmits a digital preamble and a control frame. Upon completion of the transmission of the digital preamble and the control frame, the sender resumes the transmission of the visible frame to the receiver to secure visibility. The receiver also periodically transmits the visible frame to the sender until receiving the control frame from the sender, and upon receiving the control frame from the sender, it stops the transmission of the visible frame and transmits a digital preamble and an ACK frame to the sender to respond to the received control frame. After transmitting the ACK frame, the receiver resumes the transmission of the visible frame to secure visibility. The sender, being transmitting the visible frame, stops the transmission of the visible frame upon receipt of the ACK frame from the receiver, and transmits a digital preamble and a data frame to the receiver for actual data transmission. The sender, upon completing the transmission of the data frame, resumes the transmission of the visible frame to the receiver to secure visibility. The receiver, being transmitting the visible frame, stops the transmission of the visible frame upon receiving the data frame, and transmits an ACK frame to respond to the received data frame. After transmitting the ACK frame, the receiver resumes the transmission of the visible frame to secure visibility.

FIG. 7C is a flow diagram illustrating in more detail a data flow in a part 710 indicated by a dotted line during data transmission illustrated in FIG. 7A, and FIG. 7D is a flow diagram illustrating in more detail a data flow in a part 720 indicated by a dotted line during data transmission illustrated in FIG. 7A.

With reference to FIGS. 7C and 7D, an operation of the sender will be described. Referring to FIG. 7C, the sender transmits a control frame to the receiver, and upon completing the transmission of the control frame, it transmits a visible frame to the receiver for visibility of a communication link. Upon receiving an ACK frame from the receiver in response to the received control frame during transmission of the visible frame, the sender stops the transmission of the visible frame and then transmits a data frame.

Referring to FIG. 7D, the sender transmits the data frame to the receiver, and upon completing the transmission of the data frame, it resumes the transmission of the visible frame to the receiver. Upon receiving an ACK frame from the receiver in response to the received data frame during transmission of the visible frame, the sender stops the transmission of the visible frame and then transmits a next data frame.

With reference to FIGS. 7C and 7D, an operation of the receiver will be described. The receiver, being transmitting the visible frame to the sender, stops the transmission of the visible frame upon receipt of the control frame from the sender, and transmits the ACK frame to the sender to respond to the received control frame. After completing the transmission of the ACK frame, the receiver resumes the transmission of the visible frame to the sender.

Referring to FIG. 7D, the receiver, being transmitting the visible frame to the sender, stops the transmission of the visible frame upon receipt of the data frame, and transmits the ACK frame to the sender to respond to the received data frame. After completing the transmission of the ACK frame, the receiver resumes the transmission of the visible frame to the sender.

In the foregoing description with reference to FIGS. 7C and 7D, a description of a digital preamble has been omitted.

Referring to FIGS. 7C and 7D, in data transmission and reception of a visible light communication system according to an embodiment of the present invention, during non-transmission of data as well as during transmission of data from the sender to the receiver or from the receiver to the sender, the sender and the receiver continuously transmit the visible frame to their counterparts with a predetermined gap, thereby providing the visibility of a communication channel.

Figure 8:
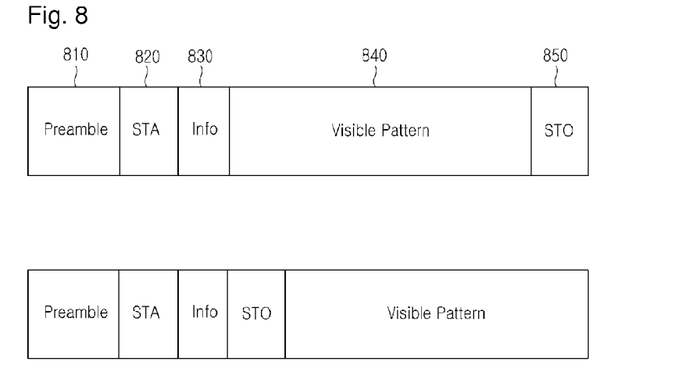
FIG. 8 illustrates a structure of a visible frame in a visible light communication system according to an embodiment of the present invention.

FIG. 8 illustrates a structure of a visible frame in a visible light communication system according to an embodiment of the present invention. As illustrated in FIG. 8, the visible frame of the visible light communication system according to an embodiment of the present invention includes a preamble 810, a start (STA) 820, an information (Info) block 830, a stop (STO) 850, and a visible pattern block 840. The visible frame of the visible light communication system according to an embodiment of the present invention may be structured in two different formats as illustrated in FIG. 8 according to implementation methods, and a structure of a transceiver may also be changed depending on the implementation methods.

The preamble 810 is a signal of '1010101010' where '1' and '0' are repeated, and is set to have a bit length of time sufficient for a CDR of a receiving end to recover a clock and data, and preferably a bit length of 10 bits. The CDR extracts (recovers) a clock signal and a data signal from a received signal based on received packets.

The STA 820 serves as a begin flag indicating the start of a frame, includes a particular bit sequence, and is set the same as a bit sequence of ultra fast IrDa (UFIR) in a VLC protocol according to an embodiment of the present invention.

The STO 850 serves as an end flag indicating the end of a frame, includes a particular bit sequence, and is set the same as a bit sequence of UFIR in the VLC protocol according to an embodiment of the present invention.

The Info block 830 is a flag indicating information on the visible pattern block 740. The Info block 830 includes a packet type part marking the visible frame with 1 byte, a payload pattern part defining a pattern of a payload with 1 byte, and a length part defining a length of a visible pattern with 2 bytes. The length part sets a maximum length of the visible frame to 32 Kbytes.

The visible pattern block 840 is defined as a code that is not used in an 8B/10B encoding scheme. The code is as below.

11111 11111
11110 11111
11110 11110
11101 11100
11001 11100
10001 11100
00001 11100
00001 11000
00001 10000
00001 00000
00000 00000

Figure 9:
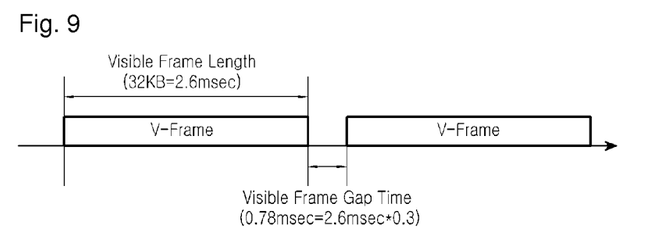
FIG. 9 illustrates a period of a visible frame in a visible light communication system according to an embodiment of the present invention.

FIG. 9 illustrates a period of a visible frame in a visible light communication system according to an embodiment of the present invention. A period of a visible frame can be determined by using Equation 1 with a measurement of a brightness of a visible communication module.

$$\text{Visible Frame Gap Time} = \text{Visible Frame Length} * \text{Visible Threshold} \qquad (1),$$

where 'Visible Frame Gap Time' indicates a gap (or interval) between visible frames, 'Visible Frame Length' indicates a length of the visible frame, and 'Visible Threshold' indicates a visible threshold value.

As illustrated in FIG. 9, when a visible light link is constructed with a visible light transmitter having a Visible Threshold of 0.3, the gap between visible frames is controlled to be within 30% of the Visible Frame Length and the visible frames are transmitted with the controlled gap, thereby forming a data link layer having visibility.

The operations and constructions of a method and apparatus for transmitting and receiving data in a visible light communication system according to an embodiment of the present invention can be made as described above, and while the present invention has been shown and described with reference to a detailed embodiment thereof, various changes in form and details may be made therein without departing from the scope of the invention.

The invention claimed is:

1. An apparatus for transmitting and receiving data in a visible light communication system, the apparatus comprising:
a visible light communication (VLC) transceiver for converting a visible light signal received from a counterpart into an electrical signal and outputting the electrical signal, by using a light receiving device during a reception operation, and converting an electrical signal containing information into a visible light signal and transmitting the visible light signal to the counterpart, by using a light emitting device during a transmission operation;

a VLC controller comprising a visible frame engine (VFE) for generating a visible frame and outputting the visible frame to the VLC transceiver, in which the VFE generates the visible frame for transmission to a counterpart during non-transmission of respective frames for communication at a sender and a receiver in order to provide visibility to a communication link; and a host controller for controlling the VLC controller and transmitting and receiving data to and from the VLC controller.

2. The apparatus of claim 1, wherein the VLC controller comprises:

a transmission and reception (TRx) buffer for storing transmission data and received data for communication;

an 8B/10B encoder/decoder for converting a format of the transmission data into a format suitable for 8B/10B;

a serializer/deserializer for converting serial signals and parallel signals; and a control register for receiving information required for controlling the VLC controller from the host controller, processing the received information, and providing information required for controlling the VLC controller.

3. The apparatus of claim 1, wherein the frames for communication include a control frame, an acknowledge (ACK) frame, and a data frame.

4. The apparatus of claim 1, wherein the host controller is connected with the VLC controller by using a central processing unit (CPU) interface.

5. A method for transmitting and receiving data in a visible light communication system, the method comprising:

transmitting, by a sender, a control frame for link control to a receiver;

receiving, by the receiver, the control frame and transmitting an acknowledge (ACK) frame to the sender to respond to the control frame;

transmitting, by the sender, a data frame containing information to the receiver; and receiving, by the receiver, the data frame and transmitting an ACK frame to the sender to respond to the data frame, wherein a visible frame is transmitted to a counterpart during non-transmission of respective frames for communication at the sender and the receiver in order to provide visibility to a communication link.

6. The method of claim 5, wherein the visible frame is repetitively transmitted with a predetermined gap.

7. The method of claim 6, wherein the predetermined gap is calculated using:

$$\text{Visible Frame Gap Time} = \text{Visible Frame Length} * \text{Visible Threshold}$$

where 'Visible Frame Gap Time' indicates a gap between visible frames, 'Visible Frame Length' indicates a length of the visible frame, and 'Visible Threshold' indicates a visible threshold value.

8. The method of claim 5, wherein each of the control frame, the data frame, and the ACK frame is transmitted together with a digital preamble behind the digital preamble.

9. The method of claim 5, wherein the length of the visible frame is set to a maximum of 32 Kbytes.

10. The method of claim 5, wherein the visible frame comprises:

a preamble which is a signal having '1' and '0' repeated in a predetermined number of bits;

a start (STA) including a particular bit sequence to indicate a start of a frame;

an information (Info) block indicating information on a visible pattern block;

the visible pattern block defined as a code that is not used in an 8B/10B encoding scheme; and a stop (STO) including a particular bit sequence to indicate an end of the frame.

11. The method of claim 10, wherein the length of the preamble is set taking into account a time required for a clock-data recovery (CDR) of the receiver to recover a clock and data.

12. The method of claim 10, wherein the length of the preamble is set to 10 bits.

13. The method of claim 10, wherein the information block comprises information on a packet type part marking the visible frame, on a payload pattern part defining a pattern of a payload, and on a length part indicating a length of the visible frame.

* * * * *